J. Shepard.
Wheel Plow.

No. 91,973. Patented Jun. 29, 1869.

Witnesses,

Inventor,
J. Shepard
per
Attorney.

United States Patent Office.

JOSIAH SHEPARD, OF NEWPORT, MAINE.

Letters Patent No. 91,973, dated June 29, 1869.

IMPROVEMENT IN CULTIVATORS.

The Schedule referred to in these Letters Patent and making part of the same.

*To all whom it may concern:*

Be it known that I, JOSIAH SHEPARD, of Newport, in the county of Penobscot, and State of Maine, have invented a new and improved Cultivator; and I do hereby declare that the following is a full, clear, and exact description thereof, which will enable others skilled in the art to make and use the same, reference being had to the accompanying drawing, forming part of this specification, in which—

Similar letters of reference indicate corresponding parts.

My invention has for its object to furnish an improved cultivator, which shall be so constructed and arranged, that it may be readily adjusted for turning the soil towards or from the row of plants being cultivated, or to break down and level off ridges or rows of hills, or for digging potatoes; and It consists in the construction and combination of the various parts of the machine, as hereinafter more fully described.

A are two small plows, which are so formed as to turn the soil in opposite directions, and the upper ends of the standards of which are secured to the forward ends of the two bars B.

C are two wheels, which are placed directly in the rear of the plows A, and the journals of which work in bearings in the supporting-bars D, the forward ends of which are attached to the standards of the plows A, and the rear ends of which are attached to the rear ends of the bars B. The wheels C partially support the machine, diminish the friction, and give steadiness to it while being used.

Figure 1:
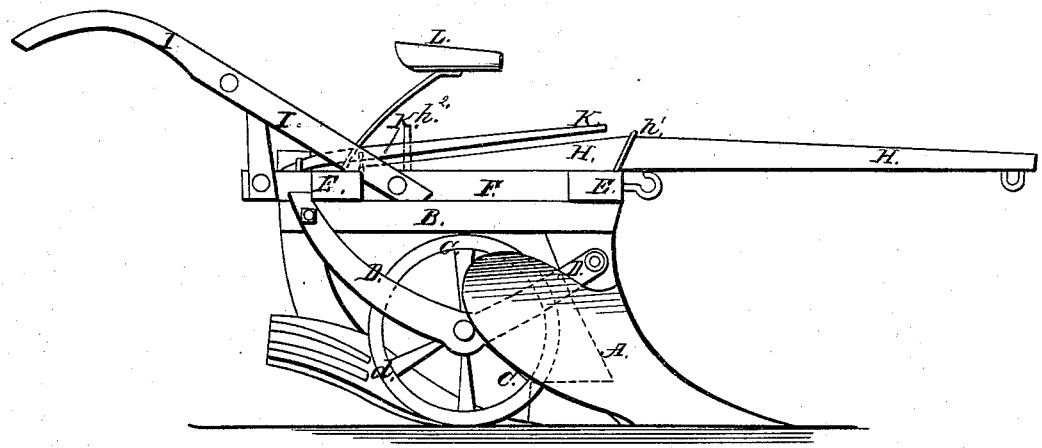
Figure 1 is a side view of my improved cultivator.
Figure 2:
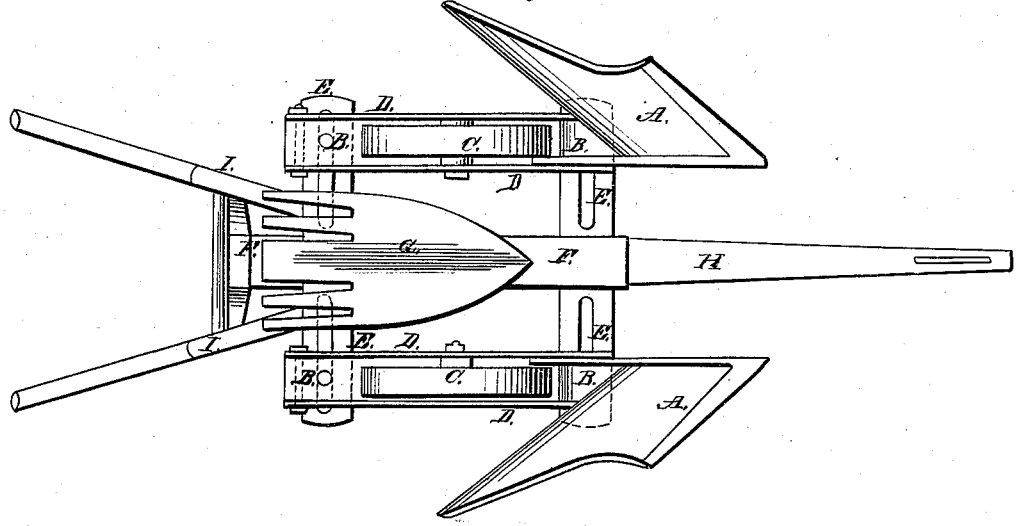
Figure 2 is an under-side view of the same.

The ends of the bars B are adjustably secured to the cross-bars E by bolts and nuts, said bolts passing through slots in the said cross-bars, as shown in fig. 2.

The middle parts of the cross-bars E are securely attached to the central bar F, to the rear end of which is attached the standard of the plow G, which is so formed as to turn the soil in both directions, and upon the rear parts of the rings of which are formed fingers, by means of which the soil is finely broken up, as the machine is drawn forward.

H is the tongue or beam, which is connected with the middle part of the forward cross-bar E by the long staple $h^1$, to which the said beam is pivoted, so that the plows may be made to run shallower, or out of the ground, by bearing down upon the handles I, which are attached to the rear part of the central bar F.

The movement of the rear end of the beam H is limited by the long staple or keeper $h^2$, attached to the rear part of the central bar F.

K is a lever, the rear end of which is pivoted to the rear end of the central bar F, and which is also pivoted to the rear end of the beam H, so that the driver, from his seat L, by raising the free end of the lever K, can cause the plows to run shallower, or to run out of the ground, as he may desire.

Having thus described my invention,

What I claim as new, and desire to secure by Letters Patent, is—

1. The combination of the two small plows A, bars B, supports D, wheels C, central bar F, and central plow G, having fingers formed upon the rear edges of its rings, with each other, substantially as herein shown and described, and for the purpose set forth.

2. The pivoted tilting-beam H, pivoted lever K, and staples $h^1$ $h^2$, arranged upon the frame B E F, bearing the wheels C, as herein described, for the purpose specified.

JOSIAH SHEPARD.

Witnesses:
C. H. SHEPARD,
ATKINSON HOBART.